US012586997B2

(12) United States Patent
Kuroda et al.

(10) Patent No.: US 12,586,997 B2
(45) Date of Patent: Mar. 24, 2026

(54) ELECTRICAL CONNECTION BOX

(71) Applicant: Sumitomo Wiring Systems, Ltd.,
Yokkaichi (JP)

(72) Inventors: Atsushi Kuroda, Yokkaichi (JP);
Akihiro Oda, Yokkaichi (JP); **Yuya
Matsuo**, Yokkaichi (JP)

(73) Assignee: Sumitomo Wiring Systems, Ltd.,
Yokkaichi (JP)

( * ) Notice: Subject to any disclaimer, the term of this
patent is extended or adjusted under 35
U.S.C. 154(b) by 264 days.

(21) Appl. No.: 18/546,921

(22) PCT Filed: Feb. 9, 2022

(86) PCT No.: PCT/JP2022/005113
§ 371 (c)(1),
(2) Date: Aug. 17, 2023

(87) PCT Pub. No.: WO2022/181339
PCT Pub. Date: Sep. 1, 2022

(65) Prior Publication Data
US 2024/0146045 A1 May 2, 2024

(30) Foreign Application Priority Data
Feb. 24, 2021 (JP) ................................ 2021-027790

(51) Int. Cl.
*H02G 3/08* (2006.01)
*B60R 16/023* (2006.01)
(52) U.S. Cl.
CPC ......... *H02G 3/088* (2013.01); *B60R 16/0238*
(2013.01); *H02G 3/081* (2013.01); *H02G
3/086* (2013.01)

(58) Field of Classification Search
CPC .......... H02G 3/08; H02G 3/081; H02G 3/086;
H02G 3/088; H02G 3/10; B60R 16/00;
(Continued)

(56) References Cited

U.S. PATENT DOCUMENTS 6,462,270 B1 * 10/2002 Depp ..................... H02G 3/081
174/50
6,541,700 B2 * 4/2003 Chiriku .................. H02G 3/081
174/50
(Continued)

FOREIGN PATENT DOCUMENTS

| JP | H11-233955 A | 8/1999 |
| JP | 2001-118628 A | 4/2001 |
| JP | 2017-028760 A | 2/2017 |

OTHER PUBLICATIONS

International Search Report, Application No. PCT/JP2022/005113,
mailed May 10, 2022. ISA/Japan Patent Office.

*Primary Examiner* — Angel R Estrada
(74) *Attorney, Agent, or Firm* — Honigman LLP

(57) ABSTRACT

Provided is an electrical connection box with a simple
configuration that can prevent liquid from running into a
housing. An electrical connection box for a vehicle provided
with a case member for installing a first fuse includes a
removal port formed at a front surface of the case member,
the removal port enabling the first fuse to be installed and
removed; and a groove formed around the removal port, the
groove guiding liquid running down the front surface away
from the removal port.

10 Claims, 7 Drawing Sheets

(58) Field of Classification Search
CPC ...... B60R 16/02; B60R 16/0238; H05K 5/00;
H05K 5/02; H05K 5/0217; H05K 5/03
USPC .... 174/50, 520, 535, 559, 564; 220/3.2–3.9,
220/4.02; 439/76.1, 76.2, 949; 361/600,
361/601
See application file for complete search history.

(56) References Cited

U.S. PATENT DOCUMENTS

| | | | |
|---|---|---|---|
| 7,253,356 B2 * | 8/2007 | Kiyota ................... | H02G 3/081 |
| | | | 174/50 |
| 7,532,458 B2 * | 5/2009 | Sasaki ................ | B60R 16/0239 |
| | | | 439/76.2 |
| 7,549,873 B2 * | 6/2009 | Hayakawa ............. | H05K 7/026 |
| | | | 439/949 |
| 7,639,476 B2 * | 12/2009 | Sasaki ................ | H01R 13/5227 |
| | | | 174/50 |
| 7,699,622 B2 * | 4/2010 | Sakamoto .......... | H01R 13/6658 |
| | | | 439/76.1 |
| 8,426,752 B2 * | 4/2013 | Hashikura .......... | H05K 7/20854 |
| | | | 439/76.2 |
| 2008/0055821 A1 | 3/2008 | Sasaki et al. | |
| 2019/0006876 A1 | 1/2019 | Manova-Elssibony | |

* cited by examiner

FRONT

LEFT ← → RIGHT

BACK

UP

FRONT ← → BACK

DOWN

UP

LEFT ← → RIGHT

DOWN

ELECTRICAL CONNECTION BOX

CROSS-REFERENCE TO RELATED APPLICATIONS

This application is the U.S. national stage of PCT/JP2022/005113 filed on Feb. 9, 2022, which claims priority of Japanese Patent Application No. JP 2021-027790 filed on Feb. 24, 2021, the contents of which are incorporated herein.

TECHNICAL FIELD

The present disclosure relates to an electrical connection box for a vehicle provided with a housing.

BACKGROUND

Many known vehicles are provided with an electrical connection box for supplying power disposed between a power supply and electrical components. A plurality of electronic components are installed in the electrical connection box, these electronic components being housed inside a housing for protection from damage, water leaks, and the like.

The electrical connection box provided with a bracket described in JP 2017-28760A has a configuration in which, to protect a plurality of wire harnesses connected to the electrical connection box of a vehicle from liquid such as rainwater and the like, a portion of the bracket attached to the electrical connection box is configured to cover the electrical connection box and catch liquid.

Many electrical connection boxes include electronic components, such as a fuse, that require replacement. Thus, to facilitate the task of replacing such an electronic component, a housing of the electrical connection box is provided with a through hole that extends through from the inside to the outside of the housing, allowing the user to replace the electronic component via this through hole.

However, in cases such as driving in the rain or washing the car, liquid such as rainwater and the like comes into contact with the electrical connection box and may run into the housing through the through hole. This may cause a problem such as a failure or malfunction of the electronic component. The electrical connection box according to JP 2017-28760A gives no hints toward the problem of liquid running into the housing through the through hole in the housing and thus does not solve this problem.

Herein, provided is an electrical connection box that can prevent liquid from running into a housing with a simple configuration.

SUMMARY

An electrical connection box according to an embodiment of the present disclosure is an electrical connection box for a vehicle provided with a housing for installing an electronic component that includes a removal port formed at one surface of the housing, the removal port enabling the electronic component to be installed and removed; and a groove formed around the removal port, the groove guiding liquid running down the one surface away from the removal port.

Effects

According to the present disclosure, liquid running into a housing can be prevented with a simple configuration.

DETAILED DESCRIPTION OF PREFERRED EMBODIMENTS

Figure 1:
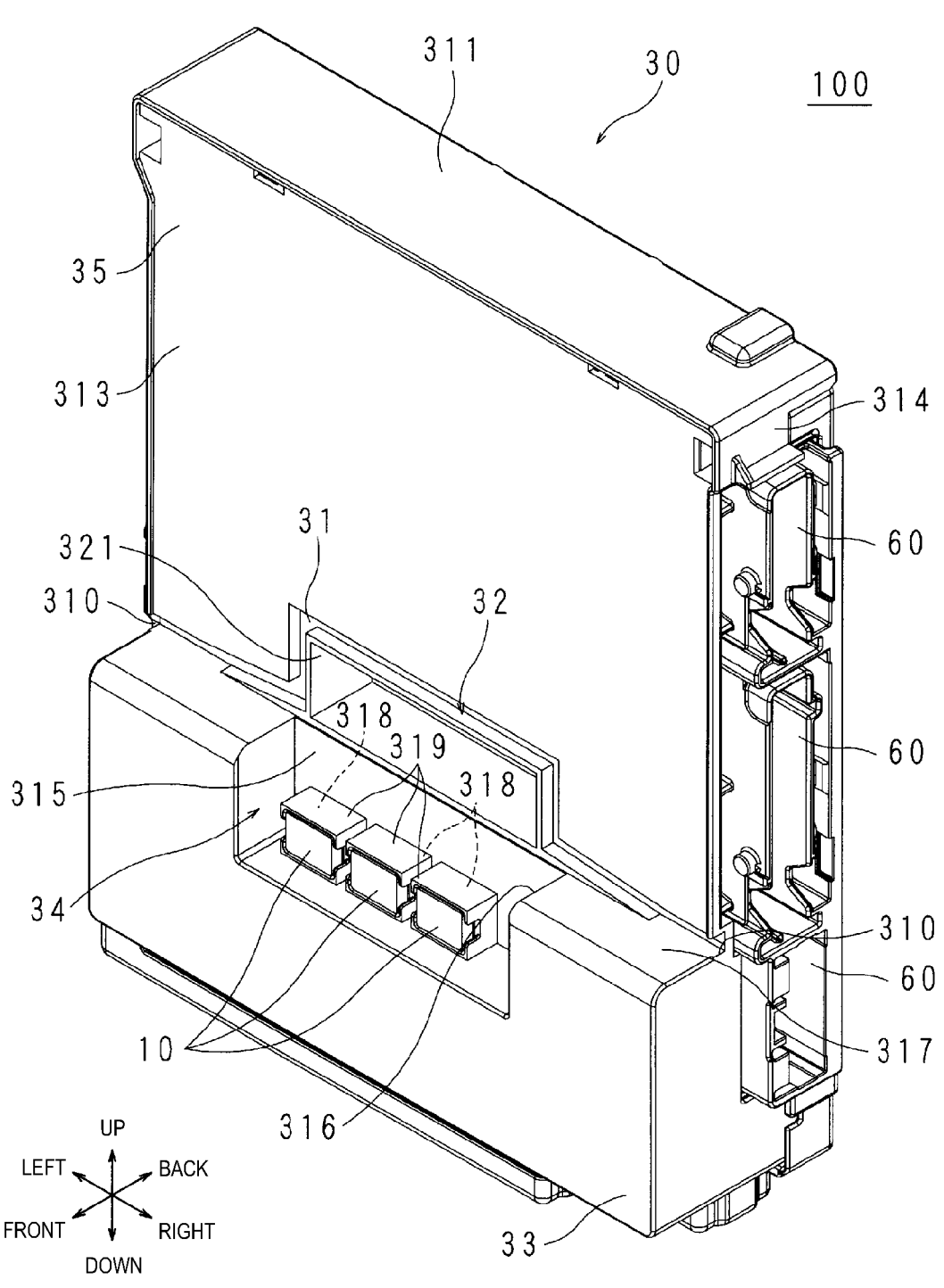
FIG. 1 is a perspective view illustrating an external appearance of an electrical connection box according to a first embodiment.

Firstly, embodiments of the present disclosure will be listed and described. One or more parts of the embodiments described below may be combined in a discretionary manner.

An electrical connection box according to an embodiment of the present disclosure is an electrical connection box for a vehicle provided with a housing for installing an electronic component that includes a removal port formed at one surface of the housing, the removal port enabling the electronic component to be installed and removed; and a groove formed around the removal port, the groove guiding liquid running down the one surface away from the removal port.

In the present embodiment, the groove is formed around the removal port. Thus, when liquid runs down the one surface of the housing, the liquid runs into the groove before reaching the removal port and is guided away from the removal port.

In the electrical connection box according to an embodiment of the present disclosure, a portion of the groove formed on an upper side from the removal port is inclined downward from a center of the groove.

In the present embodiment, at the upper side from the removal port, the groove is inclined downward from the center. This increases the flow speed of the liquid running through the groove.

In the electrical connection box according to an embodiment of the present disclosure, the removal port has a rectangular shape, and the groove is formed around three side edges of the removal port, a lower side edge of the removal port being excluded, and extends toward two opposite side surfaces adjacent to the one surface.

In the present embodiment, the groove is formed around the three side edges, the lower side edge of the removal port being excluded, and extends toward two opposite side surfaces adjacent to the one surface. Thus, the liquid that runs down the one surface of the housing runs into the groove before reaching the removal port and is guided away from the removal port.

In the electrical connection box according to an embodiment of the present disclosure, the groove has a depth that increases toward end portions of the groove.

In the present embodiment, the groove has a depth that increases toward the end portions. This makes it possible to increase the flow speed of the liquid running through the groove.

In the electrical connection box according to an embodiment of the present disclosure, an insertion port is provided at the one surface at a lower portion than the removal port, the insertion port enabling another electronic component to be inserted and removed.

In the present embodiment, when liquid runs down the one surface of the housing, the liquid runs into the groove before reaching the removal port and is guided away from the removal port. Thus, liquid is prevented from running into the housing from the insertion port provided at a lower portion than the removal port.

In the electrical connection box according to an embodiment of the present disclosure, a second electronic component with lower water resistance than a first electronic component installed on a lower side from the electronic component is installed on an upper side from the electronic component.

In the present embodiment, the second electronic component with lower water resistance than the first electronic component installed on the lower side from the electronic component is installed on the upper side from the electronic component. Thus, in the case of liquid running into the housing from the removal port for some reason, no problems are immediately caused, and time to handle the situation is ensured.

An electrical connection box according to an embodiment of the present disclosure will be described with reference to the drawings. Note that the present disclosure is not limited to these examples and is defined by the scope of the claims, and all modifications that are equivalent to or within the scope of the claims are included.

First Embodiment

Figure 2:
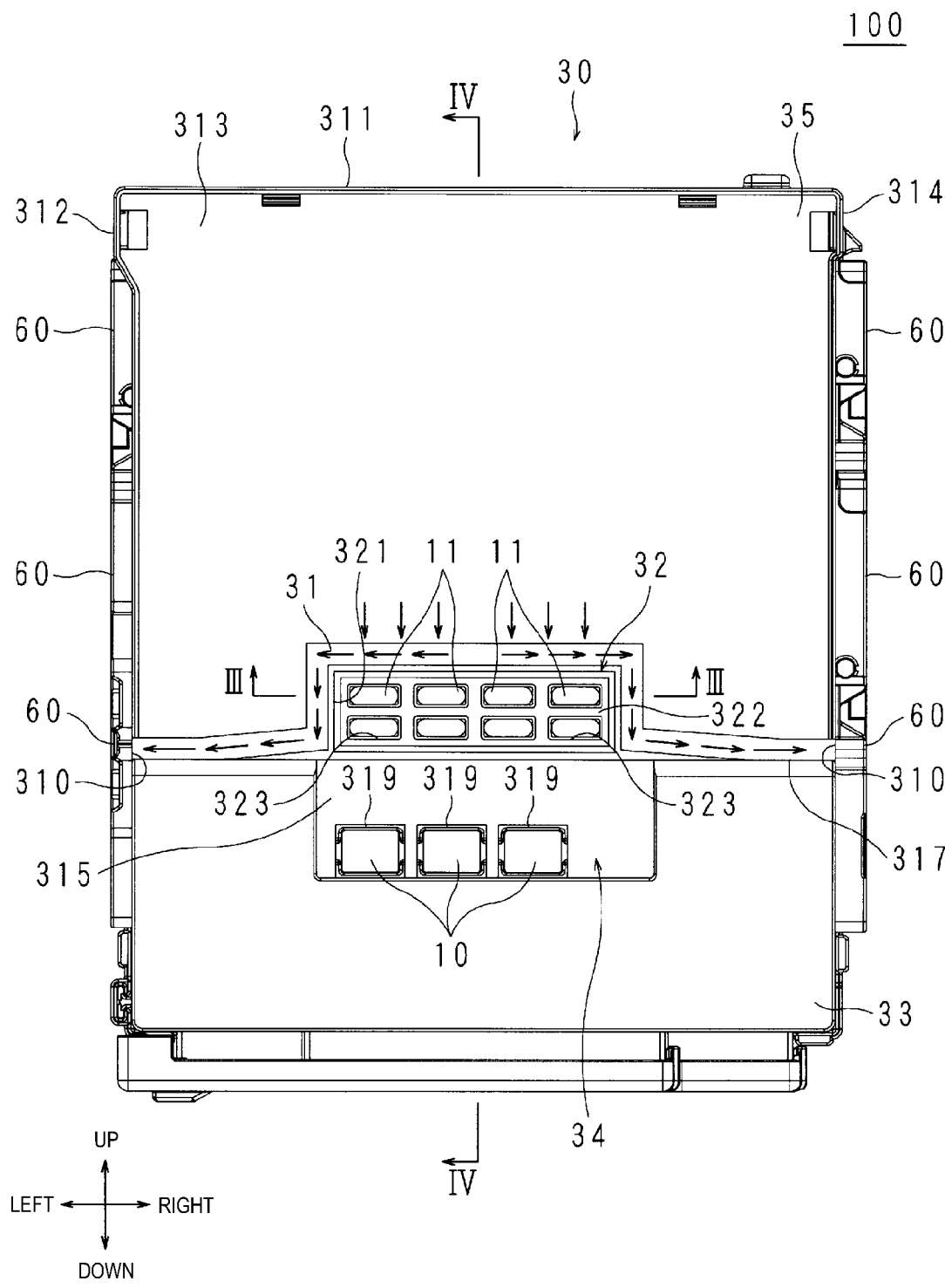
FIG. 2 is a front view of the electrical connection box according to the first embodiment.

FIG. 1 is a perspective view illustrating the external appearance of an electrical connection box 100 according to the first embodiment. FIG. 2 is a front view of the electrical connection box 100 according to the first embodiment. The electrical connection box 100 is a so-called junction box for a vehicle where electronic components such as fuses are installed.

In the present embodiment, for the sake of convenience, the front, back, left, right, up, and down of the electrical connection box 100 are defined by the directions front and back, left and right, and up and down illustrated in the drawings. The directions front and back, left and right, and up and down defined in this manner are used in the description below.

The electrical connection box 100 includes a case member 30. The case member 30 is made of metal or resin and houses a substrate 21 described below and electronic components and the like mounted on the upper surface of the substrate 21.

The case member 30 includes a case upper portion 35 at the upper portion and a case lower portion 33 at the lower portion. The case upper portion 35 is shaped like a flat rectangular parallelepiped, and the case lower portion 33 is shaped like a rectangular parallelepiped with dimensions in the front-and-back direction larger than that of the case upper portion 35. The case upper portion 35 and the case lower portion 33 are integrally formed.

In other words, the case member 30 includes a front surface 313 (one surface) encompassing both the case upper portion 35 and the case lower portion 33. The front surface 313 includes a crank-like bend forming a step 317 at the boundary between the case upper portion 35 and the case lower portion 33.

Also, an upper surface 311 extends backward from the upper side of the front surface 313 perpendicular to the front surface 313, a left surface 312 extends backward from the left side of the front surface 313 perpendicular to the front surface 313, and a right surface 314 extends backward from the right side of the front surface 313 perpendicular to the front surface 313. The left surface 312 and the right surface 314 have a larger dimension in the front-and-back direction at the case lower portion 33.

The electrical connection box 100 includes three connectors 60 at each of the left surface 312 and the right surface 314. A cutout portion (not illustrated) is formed in the left surface 312 and the right surface 314, and the connectors 60 projects outward from the case member 30 through the cutout portion of the left surface 312 and the cutout portions of the right surface 314.

A removal port 32 is provided at the case upper portion 35 at a central portion of the end portion near the case lower portion 33. A user can install and remove a first fuse (electronic component) 11 via the removal port 32.

Figure 3:
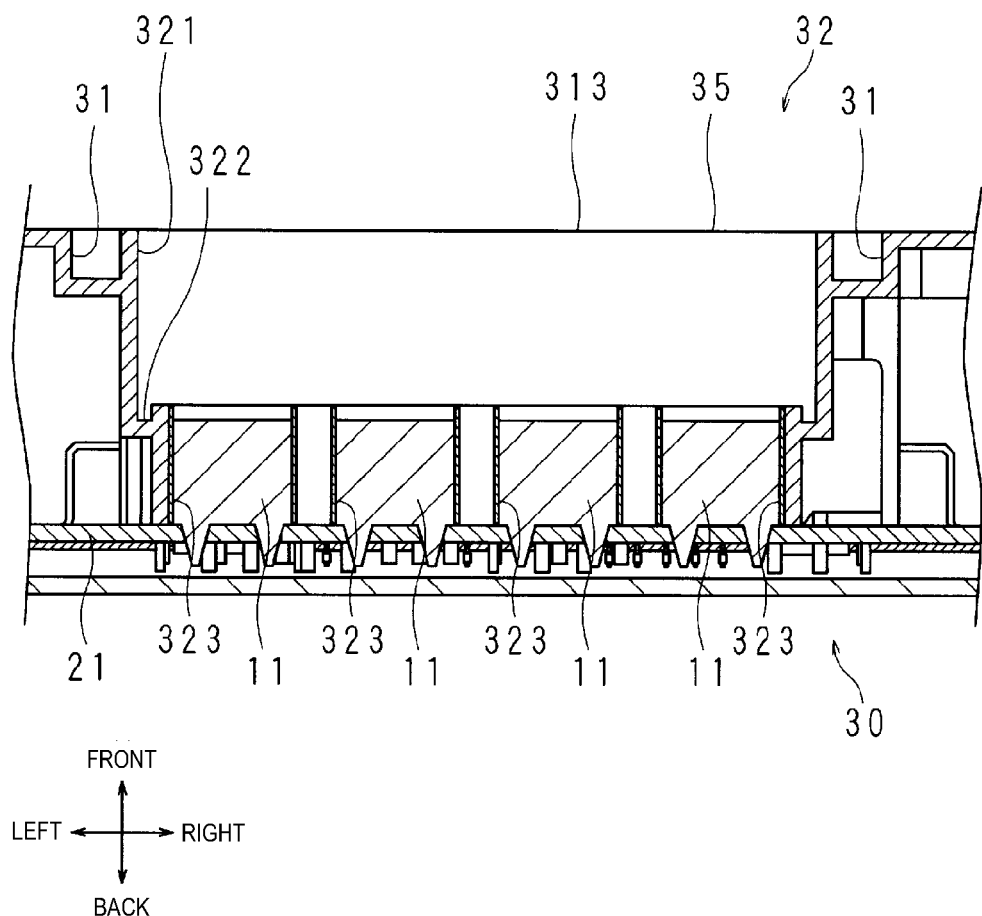
FIG. 3 is a partial cross-sectional view taken along line III-III in FIG. 2.
Figure 4:
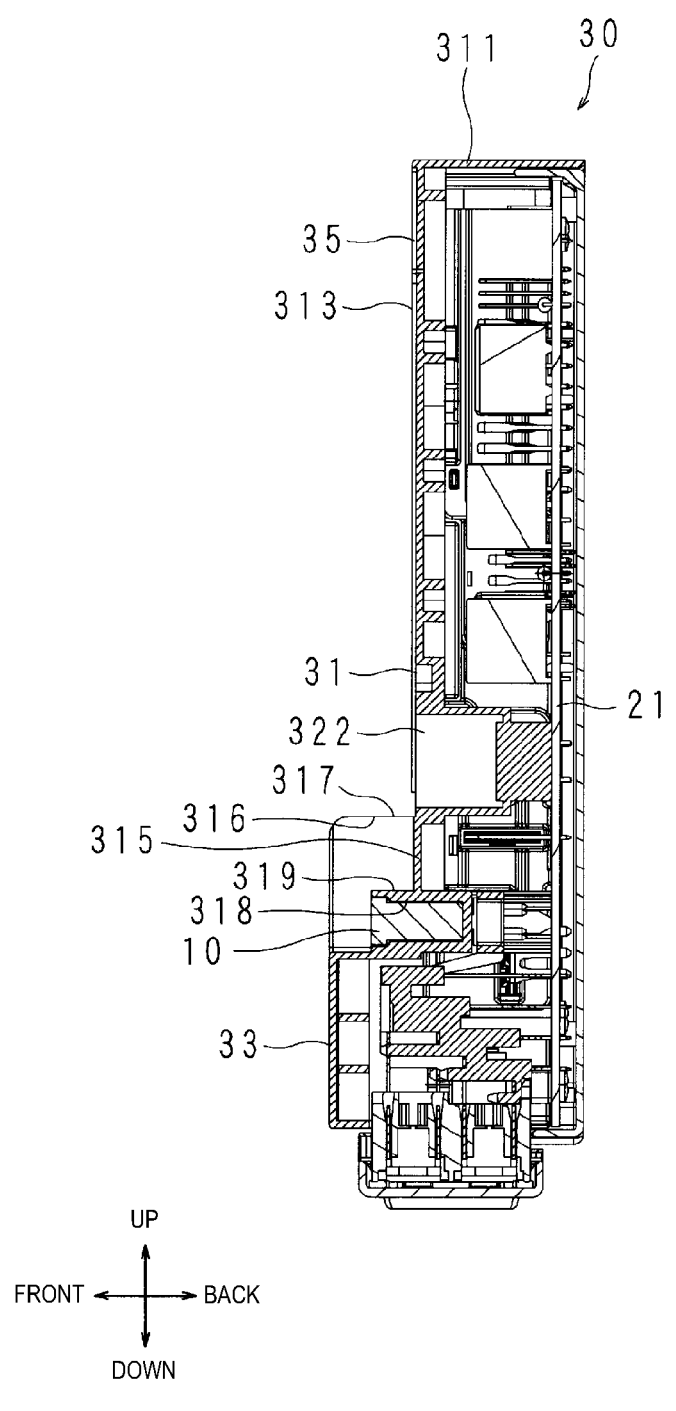
FIG. 4 is a cross-sectional view taken along line IV-IV in FIG. 2.

FIG. 3 is a partial cross-sectional view taken along line III-III of FIG. 2. FIG. 4 is a cross-sectional view taken along line IV-IV of FIG. 2. The removal port 32 includes a recess portion 321 with a rectangular shape in a front view and a plurality of insertion holes 323 formed in a bottom 322 of the recess portion 321. The insertion holes 323 extend through the bottom 322 in the thickness direction. The bottom 322 has a rectangular shape with the long side direction corresponding to the left-and-right direction. The plurality of insertion holes 323 form a grid-like shape in the bottom 322.

The insertion holes 323 each have a rectangular shape with the long side direction corresponding to the left-and-right direction. Eight insertion holes 323 are formed in the bottom 322, for example. The insertion holes 323 are formed side by side in a row in the left-and-right direction, with two rows being formed in the up-and-down direction.

Each first fuse 11 is a so-called blade fuse and is inserted into the corresponding insertion hole 323 and removably installed on the substrate 21. As illustrated in FIG. 2, all of the first fuses 11 are exposed to the outside of the case member 30 via the removal port 32. Accordingly, a user can install and remove the first fuses 11 via the removal port 32. Thus, when one of the first fuses 11 is spent, only the spent first fuse 11 can be replaced without disassembling the case member 30.

Also, a groove 31 is formed in the front surface 313 around the removal port 32. The groove 31 guides liquid such as rainwater and the like that runs down the front surface 313 from above away from the removal port 32 and prevents the liquid from running inside the removal port 32.

The groove 31 is formed at or near three of the four side edges of the removal port 32 with the lower side edge being excluded. In other words, the groove 31 is formed skirting the upper side edge, the left side edge, and the right side edge of the removal port 32 and extends from at or near the lower end of the left side edge of the removal port 32 at an angle downward toward the left surface 312 and extends from at or near the lower end of the right side edge at an angle downward toward the right surface 314.

Furthermore, one end of the groove 31 opens at a position near the left surface 312, and the other end of the groove 31 opens at a position near the right surface 314 (see FIG. 1).

To allow liquid guided by the groove 31 to run to the outside of the case member 30, a drainage cutout portion 310 is formed at or near one end of the groove 31 on the left surface 312 and the drainage cutout portion 310 is formed at or near the other end of the groove 31 on the right surface 314.

The groove 31 blocks the flow of liquid running down the front surface 313 toward the removal port 32. As illustrated by the arrows in FIG. 2, liquid running down the front surface 313 runs into the groove 31 before reaching the removal port 32, is guided by the groove 31, and runs to the outside of the case member 30 from the drainage cutout portions 310.

A recess 34 is formed in the case lower portion 33 at an upper central portion. The recess 34 opens upward. In other words, a cutout portion 316 is formed in the step 317 at the boundary between the case upper portion 35 and the case lower portion 33 at a position corresponding to the recess 34.

A plurality of insertion ports 318 for inserting and removing second fuses (another electronic component, first electronic component) different from the first fuses 11 are provided at a bottom 315 of the recess 34 at positions on the lower side corresponding to the removal port 32 (see FIGS. 1 and 4). The second fuses 10 are inserted in the insertion ports 318. In the electrical connection box 100 according to the first embodiment, three insertion ports 318 are formed at the bottom 315, for example.

The insertion ports 318 each have a rectangular shape with the long side direction corresponding to the left-and-right direction, and three insertion ports 318 are disposed side by side in the left-and-right direction. A guide frame 319 for guiding the insertion of the second fuse 10 is provided around the edge of each insertion port 318. The guide frame 319 projects in a direction perpendicular to the bottom 315.

Each second fuse 10 is a so-called blade fuse and is inserted into the corresponding insertion port 318 via the guide frame 319 and removably installed on the substrate 21. As illustrated in FIGS. 1 and 2, all of the second fuses 10 are exposed to the outside of the case member 30. Accordingly, a user can insert and remove the second fuses 10. Thus, when one of the second fuses 10 is spent, only the spent second fuse 10 can be replaced without disassembling the case member 30.

Figure 5:
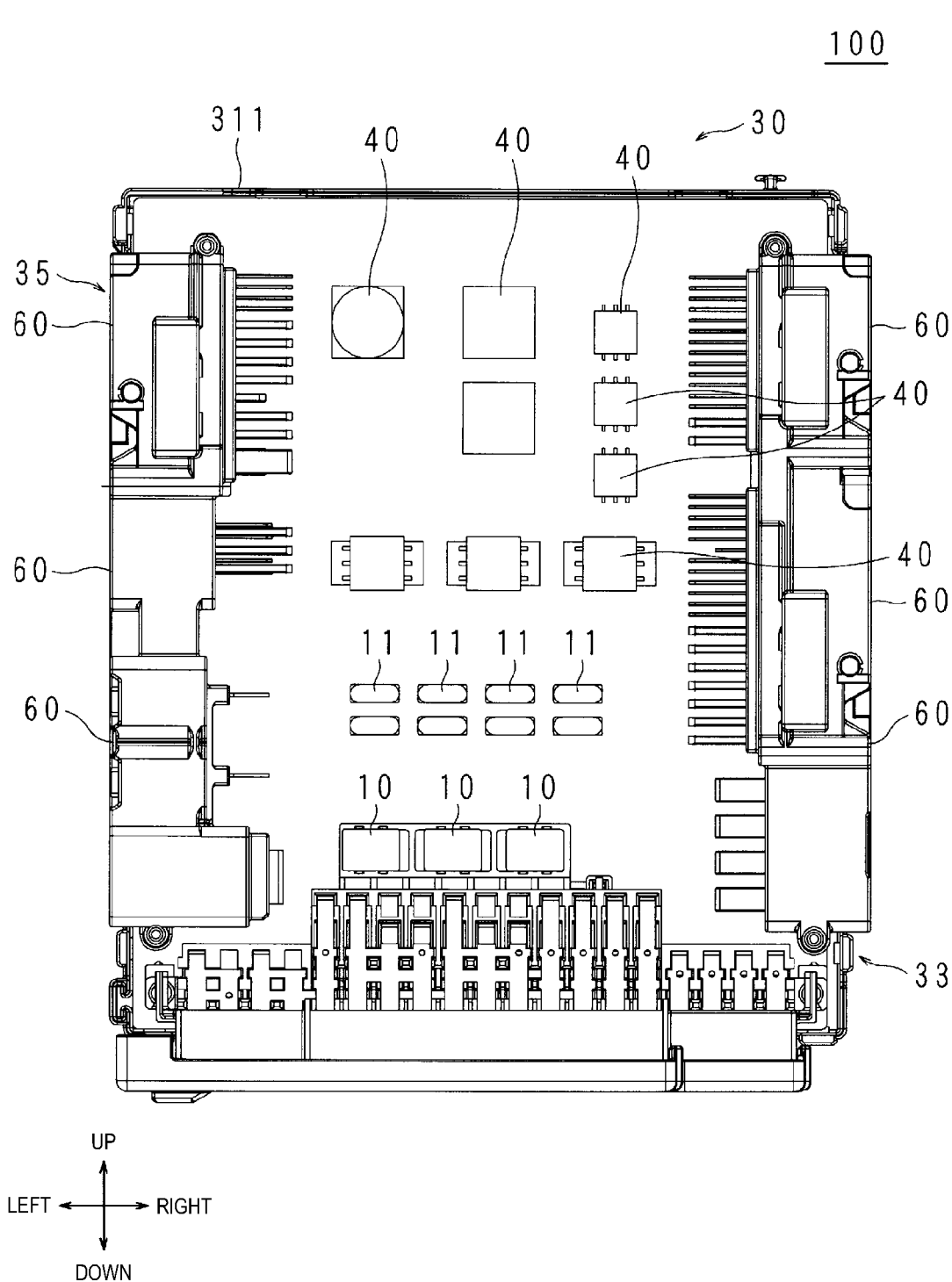
FIG. 5 is a vertical cross-sectional view illustrating the internal configuration of the electrical connection box according to the first embodiment.

FIG. 5 is a vertical cross-sectional view illustrating the internal configuration of the electrical connection box 100 according to the first embodiment. In FIG. 5, the substrate 21 is omitted from the diagram for the sake of convenience. As described above, the first fuses 11 are disposed side by side in two rows at a substantially middle portion of the case member 30 in the up-and-down direction.

The electrical connection box 100 according to the first embodiment is divided into an upper side and a lower side based on the position of the first fuses 11, with electronic components of different physical properties being installed in each. On the upper side from the first fuses 11, electronic components (hereinafter referred to as low water resistant electronic components) 40 (second electronic component) are installed which have lower water resistance than the electronic components installed on the lower side from the first fuses 11. Here, water resistance refers to the characteristic of not failing or malfunctioning when coming into contact with a liquid.

For example, a so-called semiconductor switch (for example, a MOS transistor), a semiconductor element such as a light-emitting diode, a capacitor, and the like are installed on the upper side from the first fuses 11. Also, as described above, the second fuses 10 are installed on the lower side from the first fuses 11. For example, the second fuses 10 have better water resistance than the first fuses 11.

As described above, in the electrical connection box 100 according to the first embodiment, the groove 31 is formed skirting the upper side edge, the left side edge, and the right side edge of the removal port 32, and both ends of the groove 31 open at positions near the left surface 312 and the right surface 314 on either side of the front surface 313. Accordingly, liquid that runs down the front surface 313 from above toward the removal port 32 runs into the groove 31 before reaching the removal port 32, is diverted away from the removal port 32, and runs to the outside of the case member 30 from the drainage cutout portions 310. Thus, with a simple configuration, liquid such as rainwater and the like that runs down the front surface 313 can be prevented from running inside the case member 30 via the removal port 32.

Also, as described above, in the electrical connection box 100 according to the first embodiment, the plurality of insertion ports 318 for inserting and removing the second fuses 10 are provided at a position corresponding to the removal port 32. As described above, liquid running down the front surface 313 from above is guided by the groove 31 away from the removal port 32 and diverted to the outside of the case member 30, thus preventing the liquid from running down below the groove 31. Accordingly, there is no need to provide a separate device for preventing the liquid running down the front surface 313 from running into the case member 30 through the insertion ports 318, allowing the electrical connection box 100 to be made more compact.

Also, as described above, in the electrical connection box 100 according to the first embodiment, the low water resistant electronic components 40 are installed on the upper side from the first fuses 11. Accordingly, even when the flow of liquid is unable to be fully diverted to the outside of the case member 30 by the groove 31 for some reason and the liquid runs into the case member 30 from the removal port 32, no problems are immediately caused, and the problem can be resolved by natural drying or by action taken at the time of maintenance.

In the example described above, the groove 31 is formed around the first fuses 11 (removal port 32). However, no such limitation is intended. The effect described above can also be obtained by forming the groove 31 even for electronic components exposed to the outside of the case member 30 which are not the first fuses 11.

Also, in the example described above, by providing the second fuses 10 (insertion ports 318) on the lower side from the first fuses 11, liquid is prevented from running into the case member 30 through the insertion ports 318. However, no such limitation is intended. The effect described above can also be obtained in the case of disposing electronic components exposed to the outside of the case member 30 which are not the second fuses 10 on the lower side from the first fuses 11.

Second Embodiment

Figure 6:
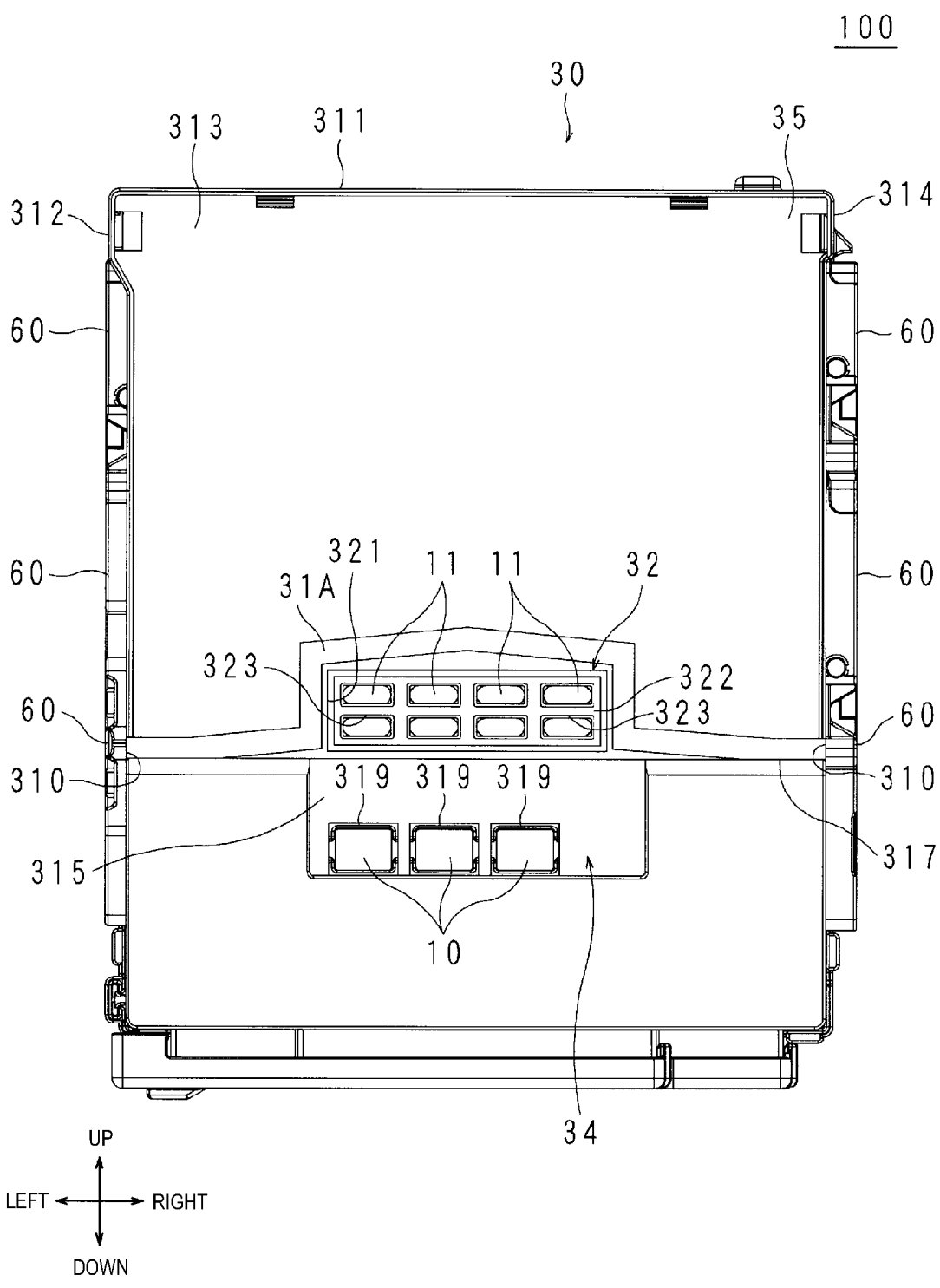
FIG. 6 is a front view illustrating the external appearance of an electrical connection box according to a second embodiment.

FIG. 6 is a front view illustrating the external appearance of the electrical connection box 100 according to the second embodiment. The electrical connection box 100 according to the second embodiment, like in the first embodiment, includes the case member 30, and the removal port 32 for installing and removing the first fuses 11 is provided at the front surface 313 of the case member 30. Also, a groove 31A is formed around the removal port 32.

The groove 31A is formed skirting the upper side edge, the left side edge, and the right side edge of the removal port 32 and extends from at or near the lower end of the left side edge of the removal port 32 at an angle downward toward the left surface 312 and extends from at or near the lower end of the right side edge at an angle downward toward the right surface 314.

In the electrical connection box 100 according to the second embodiment, the portion of the groove 31A formed at or near the upper side edge of the removal port 32 has an inverted V shape. In other words, in the electrical connection box 100 according to the second embodiment, the portion of the groove 31A formed on the upper side from the removal port 32 is formed inclining downward from the center.

Accordingly, the portion of the groove 31A formed on the upper side from the removal port 32 extends at a downward incline from the center to both sides. Thus, when liquid that runs down the front surface 313 from above runs into the groove 31A, the liquid quickly runs through the groove 31A and runs to the outside of the case member 30 from the drainage cutout portions 310. Thus, the flow speed of the liquid running in the groove 31A can be increased, allowing the groove 31A to work even when there is a large amount of liquid running down the front surface 313.

Also, in the electrical connection box 100 according to the second embodiment, liquid that runs down the front surface 313 toward the removal port 32 is guided away from the removal port 32 by the groove 31A before reaching the removal port 32 and diverted to the outside of the case member 30 from the drainage cutout portions 310. Thus, with a simple configuration, liquid such as rainwater and the like that runs down the front surface 313 can be prevented from running inside the case member 30 from the removal port 32.

Also, in the electrical connection box 100 according to the second embodiment, the plurality of insertion ports 318 for inserting and removing the second fuses 10 are provided at a position corresponding to the removal port 32. Liquid running down the front surface 313 from above is guided by the groove 31A away from the removal port 32 and diverted to the outside of the case member 30, thus preventing the liquid from running down below the groove 31A. Accordingly, there is no need to provide a separate device for preventing the liquid running down the front surface 313 from running into the case member 30 through the insertion ports 318, allowing the electrical connection box 100 to be made more compact.

In the example described above, a portion of the groove 31A formed at or near the upper side edge of the removal port 32 has an inverted V shape. However, no such limitation is intended. For example, the portion of the groove 31A may have an arc shape.

Portions that are similar to the portions in the first embodiment are given the same reference sign and will not be described in detail.

Third Embodiment

Figure 7:
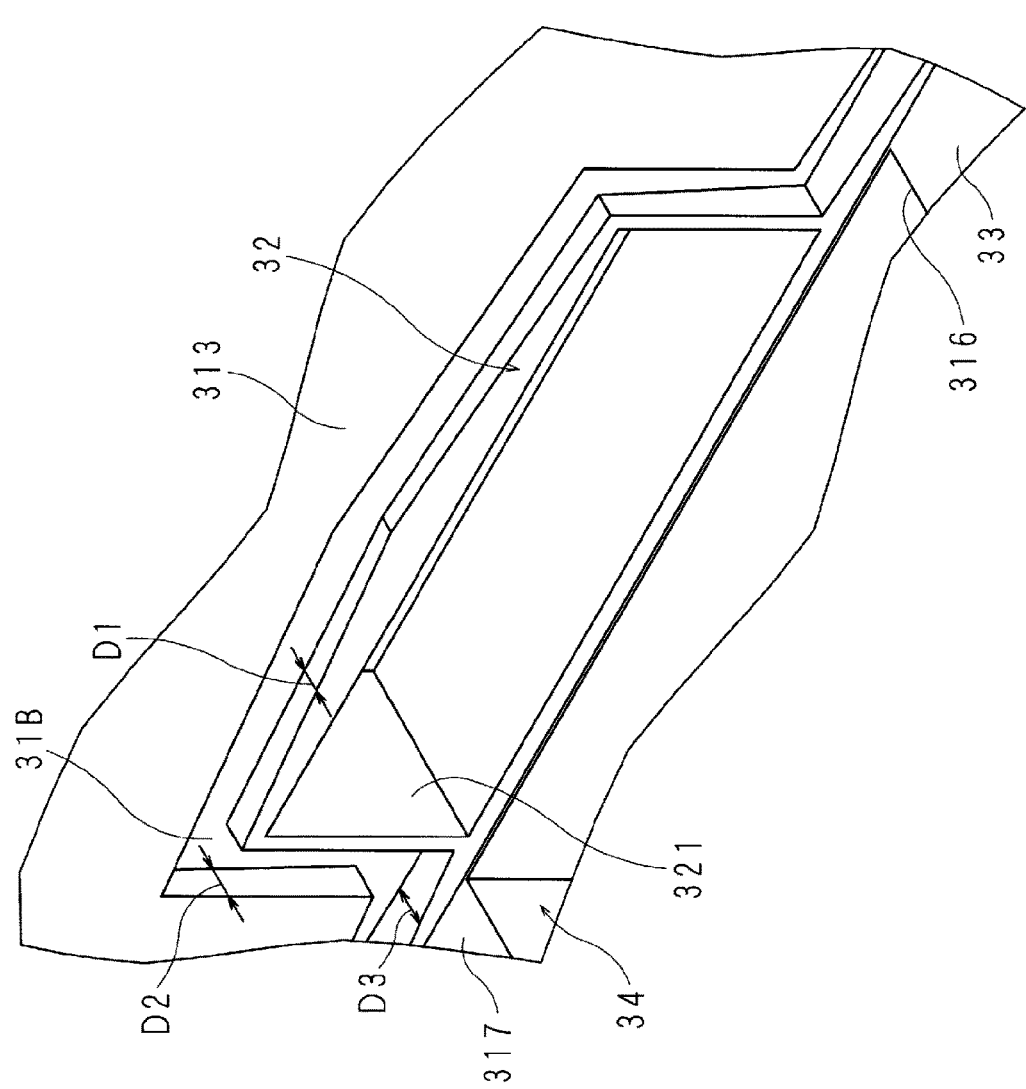
FIG. 7 is a partial enlarged view illustrating an enlarged groove of an electrical connection box according to a third embodiment.

FIG. 7 is a partial enlarged view illustrating an enlarged groove 31B of the electrical connection box 100 according to the third embodiment. The electrical connection box 100 according to the third embodiment, like in the first embodiment, includes the case member 30, and the removal port 32 for installing and removing the first fuses 11 is provided at the front surface 313 of the case member 30. Also, the groove 31B is formed around the removal port 32.

The groove 31B is formed skirting the upper side edge, the left side edge, and the right side edge of the removal port 32 and extends at an angle downward from at or near the lower end of the left side edge and from at or near the lower end of the right side edge of the removal port 32 toward the left surface 312 and the right surface 314.

In the electrical connection box 100 according to the third embodiment, the groove 31B is formed with a depth that increases toward both ends of the groove 31B. In other words, in the electrical connection box 100 according to the third embodiment, the groove 31B is formed with a depth that increases as the groove 31B extends downstream.

Thus, as illustrated in FIG. 7, in the groove 31B, a depth D2 of the groove 31B at the intermediate stream side is greater than a depth D1 of the groove 31B at the upstream side, and a depth D3 of the groove 31B at the downstream side is greater than the depth D2 of the groove 31B at the upstream side.

By the groove 31B having this configuration, in the electrical connection box 100 according to the third embodiment, the flow speed of liquid running through the groove 31B can be increased. This allows the groove 31B to work even when there is a large amount of liquid running down the front surface 313.

Also, in the electrical connection box 100 according to the third embodiment as well, liquid such as rainwater and the like running down the front surface 313 can be prevented from running into the case member 30 from the removal port 32 by the groove 31B.

Portions that are similar to the portions in the first embodiment are given the same reference sign and will not be described in detail.

The embodiments disclosed herein are examples in all respects and should not be interpreted as limiting in any manner. The scope of the present disclosure is defined not by the foregoing description, but by the scope of the claims, and all modifications that are equivalent to or within the scope of the claims are included.

The invention claimed is:

1. An electrical connection box for a vehicle provided with a housing for installing an electronic component, comprising:
   a removal port formed at one surface of the housing, the removal port enabling the electronic component to be installed and removed; and
   a groove formed around the removal port, the groove guiding liquid running down the one surface away from the removal port, wherein the removal port has a rectangular shape, and the groove is formed around three side edges of the removal port, a lower side edge of the removal port being excluded, and extends toward two opposite side surfaces adjacent to the one surface.

2. The electrical connection box according to claim 1, wherein a portion of the groove on an upper side of the removal port is inclined downward from a center of the groove.

3. The electrical connection box according to claim 1, wherein the groove has a depth that increases toward end portions of the groove.

4. The electrical connection box according to claim 1, wherein an insertion port is provided at the one surface at a lower portion than the removal port, the insertion port enabling another electronic component to be inserted and removed.

5. The electrical connection box according to claim 1, wherein a second electronic component with lower water resistance than a first electronic component installed on a lower side from the electronic component is installed on an upper side from the electronic component.

6. The electrical connection box according to claim 2, wherein the groove has a depth that increases toward end portions of the groove.

7. The electrical connection box according to claim 2, wherein an insertion port is provided at the one surface at a lower portion than the removal port, the insertion port enabling another electronic component to be inserted and removed.

8. The electrical connection box according to claim 3, wherein an insertion port is provided at the one surface at a lower portion than the removal port, the insertion port enabling another electronic component to be inserted and removed.

9. The electrical connection box according to claim 2, wherein a second electronic component with lower water resistance than a first electronic component installed on a lower side from the electronic component is installed on an upper side from the electronic component.

10. The electrical connection box according to claim 3, wherein a second electronic component with lower water resistance than a first electronic component installed on a lower side from the electronic component is installed on an upper side from the electronic component.

* * * * *